(12) United States Patent
Rakkola et al.

(10) Patent No.: US 7,216,053 B2
(45) Date of Patent: May 8, 2007

(54) LOW POWER MOTION DETECTOR

(75) Inventors: Juha Rakkola, Espoo (FI); Jukka Salminen, Espoo (FI); Kimmo Koli, Helsinki (FI); Teemu Salo, Klaukkala (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 11/027,024

(22) Filed: Dec. 30, 2004

(65) Prior Publication Data

US 2006/0161377 A1  Jul. 20, 2006

(51) Int. Cl.
*G01P 15/00* (2006.01)

(52) U.S. Cl. .......... 702/141; 702/193; 73/488; 324/162

(58) Field of Classification Search .......... 702/141
See application file for complete search history.

(56) References Cited

U.S. PATENT DOCUMENTS

| | | | |
|---|---|---|---|
| 5,130,624 A * | 7/1992 | Bashark | 318/280 |
| 5,241,850 A * | 9/1993 | Kawate | 73/1.88 |
| 5,343,411 A * | 8/1994 | Olsson | 702/141 |
| 5,585,566 A | 12/1996 | Welles | |
| 5,623,432 A * | 4/1997 | Degrauwe | 713/321 |
| 6,122,959 A * | 9/2000 | Hoshal et al. | 73/489 |
| 6,526,342 B1 | 2/2003 | Burdock et al. | |
| 6,662,099 B2 * | 12/2003 | Knaian et al. | 701/117 |
| 6,983,219 B2 | 1/2006 | Mäntyjärvi et al. | |
| 2005/0174324 A1 * | 8/2005 | Liberty et al. | 345/156 |

FOREIGN PATENT DOCUMENTS

| | | |
|---|---|---|
| EP | 1271099 | 1/2003 |
| JP | 5288767 | 11/1993 |
| JP | 10177032 | 9/1998 |
| JP | 11242049 | 12/1999 |

* cited by examiner

*Primary Examiner*—John Barlow
*Assistant Examiner*—Jonathan Moffat

(57) ABSTRACT

An energy-efficient acceleration measurement system is presented. The system includes an accelerometer, responsive to acceleration of the system, for providing an accelerometer output signal having a magnitude indicative of at least one component of the acceleration. A motion detector is responsive to the accelerometer output signal, and provides a processor interrupt signal, but only if the magnitude of acceleration reaches a threshold. The processor, responsive to the processor interrupt signal, measures the acceleration with higher accuracy than the motion detector is capable of, but in a way that consumes more power than was needed by the motion detector.

19 Claims, 5 Drawing Sheets

LOW POWER MOTION DETECTOR

FIELD OF THE INVENTION

The present invention relates to accelerometers, and more particularly to the processing of signals from an accelerometer.

BACKGROUND OF THE INVENTION

Accelerometers are used to convert gravity-induced or motion-induced acceleration into an electrical signal that can subsequently be analyzed. Accelerometers are used in widely diverse applications including automobile air bag and suspension systems, computer hard disc drives, detonation systems for bombs and missiles, and machine vibration monitors. Accelerometers are also useful in portable devices such as wireless telephones, for example in order to cause a device to power up when the device moves sufficiently to indicate that a person has picked up the device. Wireless devices such as wireless phones operate using small batteries, and therefore it is important for every component of a wireless device to consume as little power as possible, including not just an accelerometer, but also the circuits used to evaluate data from an accelerometer.

The simplest accelerometer is only able to measure one component of the acceleration vector, but more complex accelerometers are equipped to measure all three components of acceleration, in which case the accelerometer is called a 3-axis or triaxial accelerometer. The output signal from an accelerometer may be digital, or the output signal may be converted from analog to digital.

It has been well known for many decades that a typical accelerometer will include a "proof mass" (sometimes called a "seismic mass") which is attached to a spring, and the output signal will then be determined by the position of the proof mass. This process of producing an output signal is accomplished differently in different accelerometers, which may be potentiometric, or capacitive, or inductive. In recent years, other types of accelerometers have been developed which, for example, do not require and proof mass at all. The minimum size of an accelerometer has been gradually reduced over the years, as Micro Electro-Mechanical Systems (MEMS) technology has improved. Some MEMS-based accelerometers do not even require any moving parts.

The electrical output signal from an accelerometer must be processed in order to yield conclusions about the acceleration experienced by the device that houses the accelerometer. According to typical prior art techniques, the digital output signal from a triaxial accelerometer will be processed with full accuracy by an elaborate and energy-demanding process that involves, for example, a combination of high-pass and low-pass filtering, decimation, and calibration. It would be very useful if this prior art technique could be complemented by a less energy-demanding technique for use when less accuracy is required. This would be especially useful in portable wireless devices, which usually have very limited power capabilities.

SUMMARY OF THE INVENTION

The present invention describes a way to implement a motion detector that can detect acceleration of a device by very efficiently analyzing the signal from the device's triaxial accelerometer. Once this motion is detected by an energy-efficient analysis of the accelerometer output, then the acceleration can be quantified using the full accuracy of prior art signal processing techniques. In other words, the present invention roughly divides the analysis of accelerometer output into two parts: motion detection and motion quantification. The energy-demanding process of motion quantification is performed only after an energy-efficient process of motion detection has indicated that motion (e.g. acceleration) has reached a certain threshold.

The present invention automatically sets a reference level upon start-up, in order to eliminate device orientation effects. The invention also automatically updates the reference level, in order to reduce drift problems. Additionally, the invention involves summing of samples prior to comparison, in order to eliminate higher frequency signal impurities.

Accordingly, there is no main processor activity beyond what is absolutely necessary, and data is only sent to the main processor when a previously established movement detection criterion has been met. A primary purpose of this invention is to relieve the main processor of repetitious tasks, and to locally handle sensor inputs and transducer outputs in a power-efficient way, while interrupting the main processor only when necessary.

DETAILED DESCRIPTION OF THE INVENTION

Figure 1:
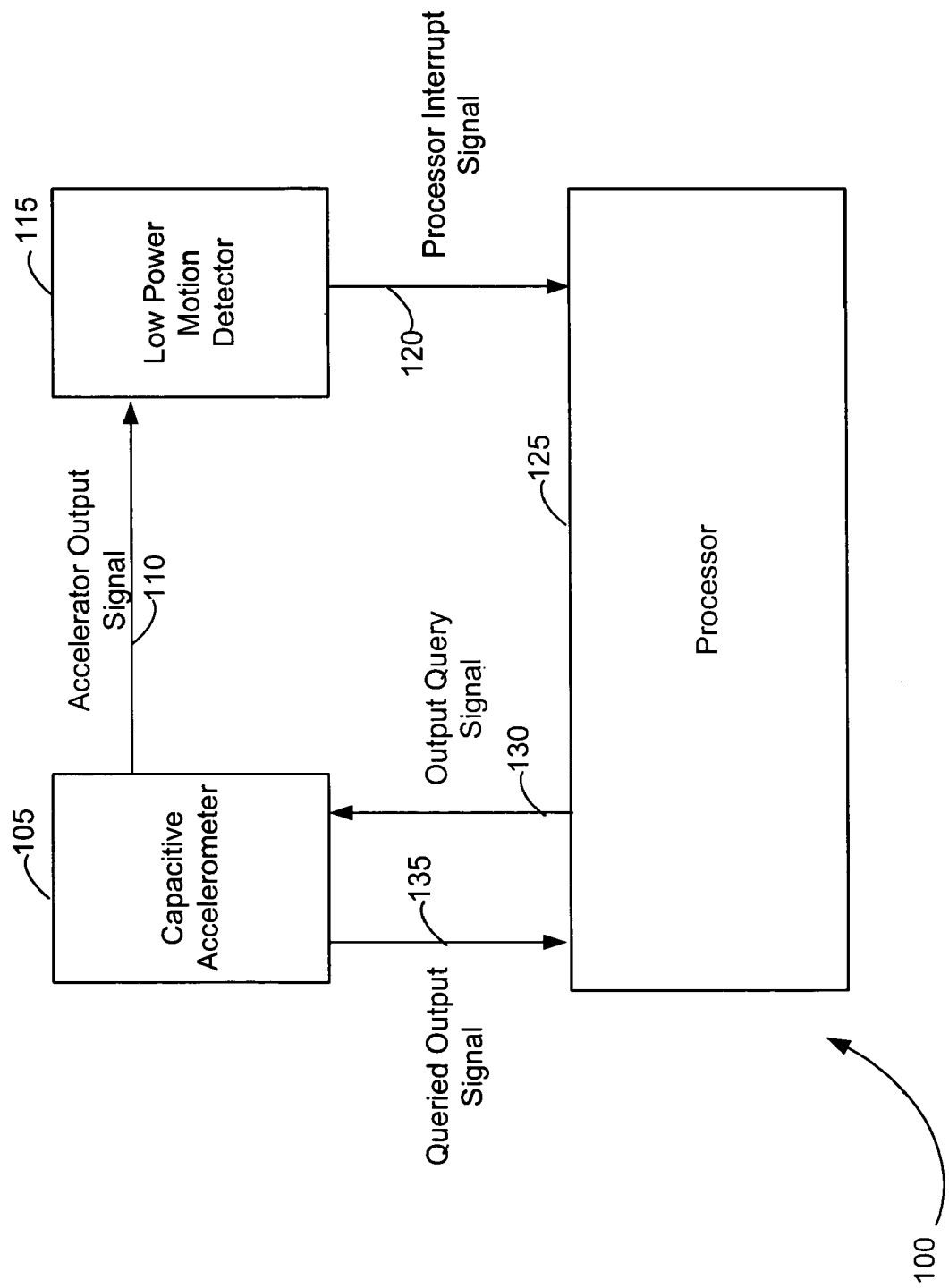
FIG. 1 shows a system including a low power motion detector.

The motion detector of the present invention uses acceleration data that has been generated by an accelerometer accompanied by measurement electronics. According to an embodiment of the present system, full accuracy acceleration measurement is obtained using a 12-bit analog to digital converter (ADC), together with digital signal processing which includes low-pass filtering, several decimation stages, and a calibration algorithm. ADC with 1 mg/1 LSB is used for a ±2 g dynamic range, and if the dynamic range changes then the absolute resolution changes accordingly. The system also includes a motion detector for the initial detection of significant motion, utilizing the lowest possible power consumption. The full accuracy mode will only be used if the motion detector mode indicates that a threshold of motion has been reached.

In the motion detector mode, higher level processing functions (e.g. using an application processor) can be kept in an idle state until there is significant movement, at which time the further processing is required. The processor of the device housing the accelerometer can thus perform other tasks, or no tasks at all, until being interrupted by a signal generated by the motion detector when acceleration exceeds a predefined limit.

The motion detector of the present invention helps to save power in several different ways. For example, the system processor is not needed to continuously monitor movement and can therefore stay in an idle state. Also, analog and digital signal processing accuracy requirements can be relaxed during the motion detector mode, which saves additional power. The analog and digital signal processing data rate (operating frequency) requirements can likewise be relaxed, in order to save more power. There is no need for constant interface activity between the accelerometer and the processor, which yields further power savings.

Once movement of the overall device is detected, the device can be switched to full accuracy mode, and the application processor can be woken up for further analysis of movement, or to perform specific actions as a response to movement.

The functionality and properties of the described motion detector have several important aspects. For example, incoming acceleration data is summed into a single register per axis. The number of samples summed in this way is a programmable setting. When the programmed number of samples has been summed, then the output is divided by shifting a bit vector to the left, in order to get an average value over a selected number of samples. This averaging procedure implements a low-pass filtering function, and makes the motion detector insensitive to higher frequency signal impurities. This averaging process consumes significantly less power than filter structures requiring multipliers.

Another important aspect of the described motion detector's embodiments is that, when the motion detector is enabled, a reference level is calculated automatically. The benefit of this function is that there is consequently no need to consider offsets on different channels when setting threshold levels, and threshold levels can also be set independently from device orientation and from the vector of gravitational force. An averaging procedure is used for this reference level calculation as well (see previous description of averaging process for incoming acceleration data). The reference levels are calculated in this way for each of the three axes, assuming that a triaxial accelerometer is used.

A further important aspect of the described motion detector's embodiments is that the reference level can be updated automatically and periodically, this period being a programmable parameter. This procedure implements a high-pass filtering function with very low corner frequency (corner frequency is the frequency of the half power point which is the frequency at which a filter is transmitting one-half of its peak transmission). This procedure also reduces motion detector sensitivity to offset drift problems, such as temperature drift. Complex machines, robots, and wireless devices that require accelerometers function in many different environments, and those accelerometers are therefore required to maintain their precision as the surrounding atmosphere changes, including alterations in humidity, pressure, and especially temperature. The reference level offset can be updated by a register write operation from the processor as well. Combined with the incoming acceleration data averaging procedure described above, this automatic updating of the reference levels implements a band pass filtering function in a very power-efficient manner. The reference levels are set without regard to device orientation of the direction of gravity, and so setting of these reference levels is greatly streamlined, with corresponding reduction of power requirements.

An additional important aspect of the described motion detector's embodiments is the idea of programming the threshold levels for each axis independently. These threshold levels are for triggering an interrupt of the main processor, and these threshold level parameters establish a difference between the level of absolute acceleration compared to the reference level, in order to trigger an interrupt. The equations for trigger conditions are as follows:

$$|ax_{current} - ax_{reference}| > ax_{threshold}.$$

$$|ay_{current} - ay_{reference}| > ay_{threshold}.$$

$$|az_{current} - az_{reference}| > az_{threshold}.$$

Yet another important aspect of the described motion detector's embodiments is that different combinations using "AND" and "OR" logical operators can be programmed for individual interrupt conditions on different axes, for the purpose of generating the interrupt of the main processor in a way that may vary depending upon what functions the overall device is being asked to perform, or depending upon other factors that may be variable. These different combinations can be programmed, for example, by setting two parameters for the x-axis, two parameters for the y-axis, and two parameters for the z-axis. Each axis can be enabled/disabled to form the OR-operation, or be required/not required to form the AND function. The following combinations are some of the possibilities:

1. x (enable x, disable y and z)
2. y (enable y, disable x and z)
3. z (enable z, disable x and y)
4. x and y (enable and require x and y)
5. x and z (enable and require x and z)
6. y and z (enable and require y and z)
7. x and y and z (enable and require x, y and z)
8. x or y (enable x and y, disable z)
9. x or z (enable x and z, disable y)
10. y or z (enable y and z, disable x)
11. x or y or z (enable x and y and z)

Thus, for example, combination #1 means that only the component of acceleration on the x-axis causes an interrupt of the main processor, whereas the other two components are not factors in this interrupt decision. Combination #4 means that both the x-component and y-component must reach a necessary threshold to cause an interrupt, regardless of the z-component of acceleration. Combination #9 means that either the x-component or z-component can cause an interrupt, and the y-component is not relevant.

The eleven possible combinations listed above are not the only possibilities. For instance, sums of squares of the conditions could be used. This would allow the system, and in particular the interrupt conditions, to function in a manner that is covariant with respect to at least one axial coordinate rotation.

As already indicated, the motion detector can trigger an interrupt signal that is used as a level-sensitive or edge-sensitive interrupt. This interrupt is set when the defined rule for interrupt is met (i.e. thresholds are exceeded on selected axis/axes). The interrupt can be cleared by writing to an interrupt acknowledge register. Status regarding which axes' acceleration threshold was exceeded can be read from the register interface.

Furthermore, an important aspect of the described motion detector's embodiments is that, when the device mode is set to motion detector mode instead of full accuracy mode, the resolution and data rate of the analog front end, ADC converter, and digital processing functions are reduced for example from 12 bits to 8 bits. Considerable saving of power can be achieved this way, and there is no need for accuracy better than 8 bits when detecting the start of movement or detecting that there is movement. For analysis of movement itself, the device can then be switched automatically into full performance mode (i.e. full accuracy mode).

Moreover, an important aspect of the described motion detector's embodiments is that the clock signal is gated off when the motion detector is in an "off" or "idle" state. The clock is also gated off when there is no new data to be processed by motion detector. This results in effective clock rate of just couple of kHz which enables extremely low power operation. The motion detector may be in an "off" or "idle" state when the device is in full accuracy mode, or when the accelerometer is not providing an significant output signal, or in other similar circumstances.

The motion detector of the present invention can be used, for instance, to implement a simple step counter. For each step, there would be acceleration exceeding the threshold, if the threshold is set correctly. This acceleration event would trigger an interrupt for a processor to update the step counter value, possibly in the graphical user interface. In another case, hardware connected to the motion detector could calculate these steps by itself, without interrupting the processor, and the processor reads the step count when needed.

Referring now to the figures, FIG. 1 shows a system 100 including a capacitive accelerometer 105 which produces an accelerometer output signal 110. The low power motion detector 115 receives and analyzes the accelerometer output signal 110, and if the motion detector determines that significant acceleration is or may be present, then the motion detector sends a processor interrupt signal 120 to a processor 125 which is either in an idle state or is performing other tasks. If the processor 125 agrees that significant acceleration is or may be present, based at least upon analyzing with greater accuracy the same data that was analyzed by the low power motion detector 115, then the processor 125 sends an output query signal 130 to the accelerometer 105 in order to seek further output from the accelerometer, and the accelerometer then provides that further output to the processor in a queried output signal 135. The processor is then able to more fully and accurately analyze the accelerometer output data and/or determine actions that need to be taken in response to the accelerometer output data.

However, it should be noted that even if a threshold of significant acceleration is reached (or may possibly have been reached), then it would sometimes be desirable to refrain from a more specific analysis by the processor 125. An example would be an application for observing the degree of activity of a user by simply counting the number of times (or rate at which) a threshold (e.g., 100 gm) is exceeded, as measured using an accelerometer 105 located at a user's wrist, in combination with the low power motion detector 115.

Figure 2:
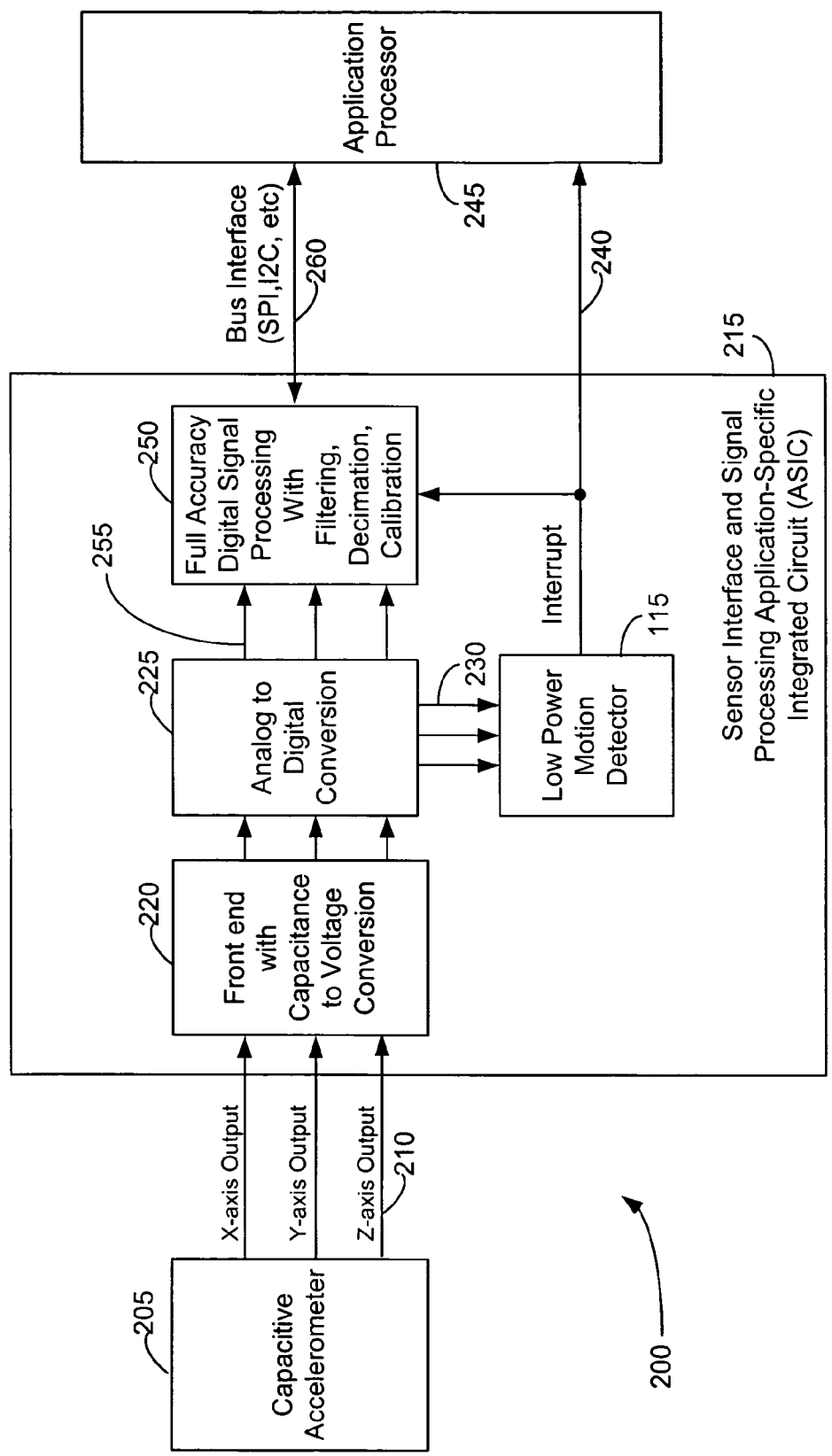
FIG. 2 shows another embodiment of the system including a low power motion detector that analyzes all three components of acceleration.

Turning to FIG. 2, this shows a system 200 according to a further embodiment of the present invention, with some more detail than in FIG. 1. The capacitive accelerometer 205 provides output 210 that includes output for each coordinate axis. This output is provided to a sensor interface and signal processing ASIC 215. This integrated circuit 215 includes a front end 220 with capability to convert capacitance to voltage (C-to-V), and this voltage is provided to an ADC 225. Note that other types of accelerometers could be used instead of a capacitive one, and some of the alternatives are potentiometric and inductive accelerometers. The resulting digital signal 230 is fed to the low power motion detector 115, which analyzes that data, and provides an interrupt signal 240 to both an application processor 245 and a full accuracy digital signal processor 250. The processor 250 then receives further digitized accelerometer output 255 for filtering, decimation, and calibration in order to more fully analyze the accelerometer output. The processor 250 is then able to provide instructions or the like to the application processor 245 via a bus interface 260, so that the application processor can take appropriate action in response to the detected and quantified acceleration.

Figure 3:
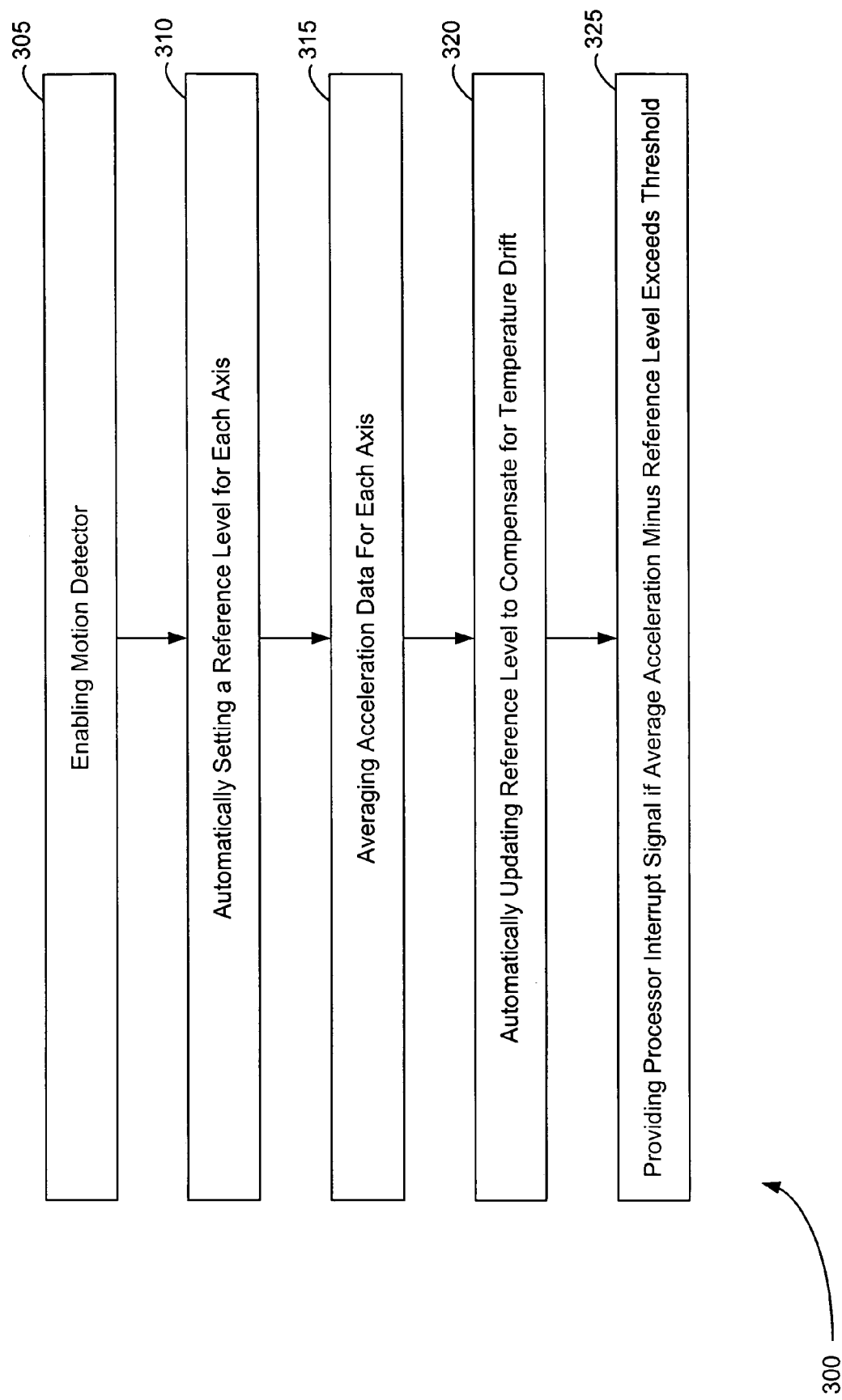
FIG. 3 shows a method according to an embodiment of the invention.

FIG. 3 shows a simplified method 300 according to an embodiment of the present invention. A low power motion detector located within a device is enabled 305, for example when the device is recharged, or when no unit in the device is detecting any acceleration. Then a reference level is set 310 for each of the three coordinate axes, which correspond to axes of the device rather than to fixed axes of the environment. Setting a reference level may involve, for example, adjusting acceleration measurements to offset errors caused by things like temperature, air pressure, humidity, and other factors that can be taken into account even before acceleration is measured. Then accelerometer data for each of the three axes is averaged 315, which is a simple and power-efficient way of deemphasizing measurement errors. The reference level(s) are automatically and periodically updated 320, to compensate for changing environmental conditions. A processor interrupt signal is provided 325 if the average acceleration minus the reference level exceeds a threshold, so that the processor can then monitor acceleration with the usual full accuracy and/or take actions in response to the detection of acceleration.

Figure 4:
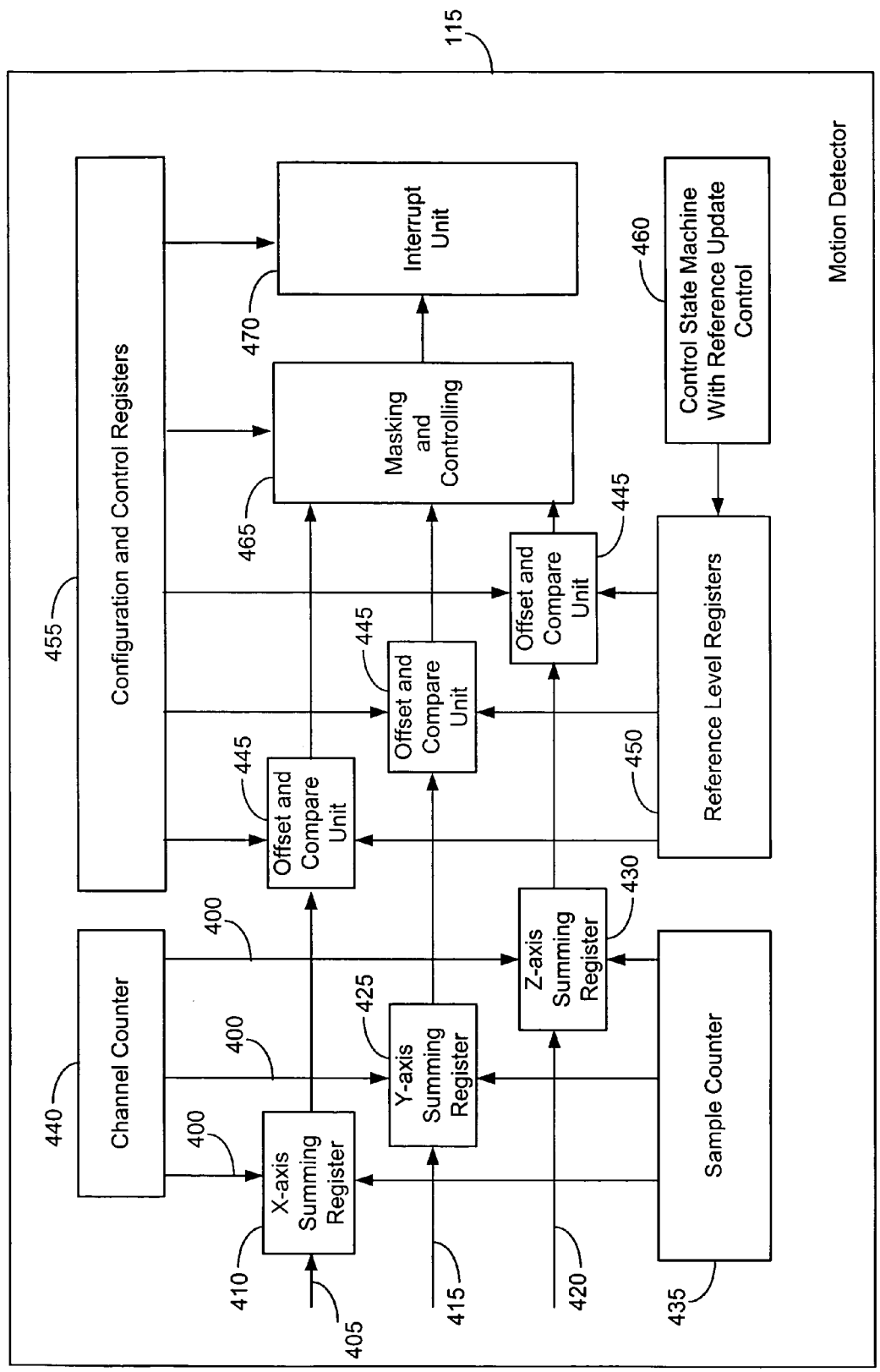
FIG. 4 shows a low power motion detector according to an embodiment of the invention.

FIG. 4 depicts an embodiment of a low power motion detector 115 according to an embodiment of the present invention. X-axis accelerometer data 405 is fed to an x-axis summing register 410, and likewise y-axis data 415 and z-axis data 420 are fed respectively to a y-axis summing register 425 and a z-axis summing register 430. Each of these three registers also receives input from a sample counter 435 and input 400 from a channel counter 440, which counters keep count of the various sums. The summing registers provide the summed averages to respective offset and compare units 445. The offset and compare units 445 apply offsets provided by at least one reference level register 450, and compare that result to at least one threshold provided to the offset and compare units 445 by at least one configuration and control register 455. The reference level register 450 is configured to accept updates from a machine 460 which controls the reference level updating process. The offset and compare units 445 provide the results of their offsetting and comparison to a masking and combining unit 465 that will apply a combination such as combinations 1–11 listed above. If the result of that combination is detection of a significant acceleration, then an interrupt unit 470 is responsible for alerting components outside the motion detector 115.

Figure 5:
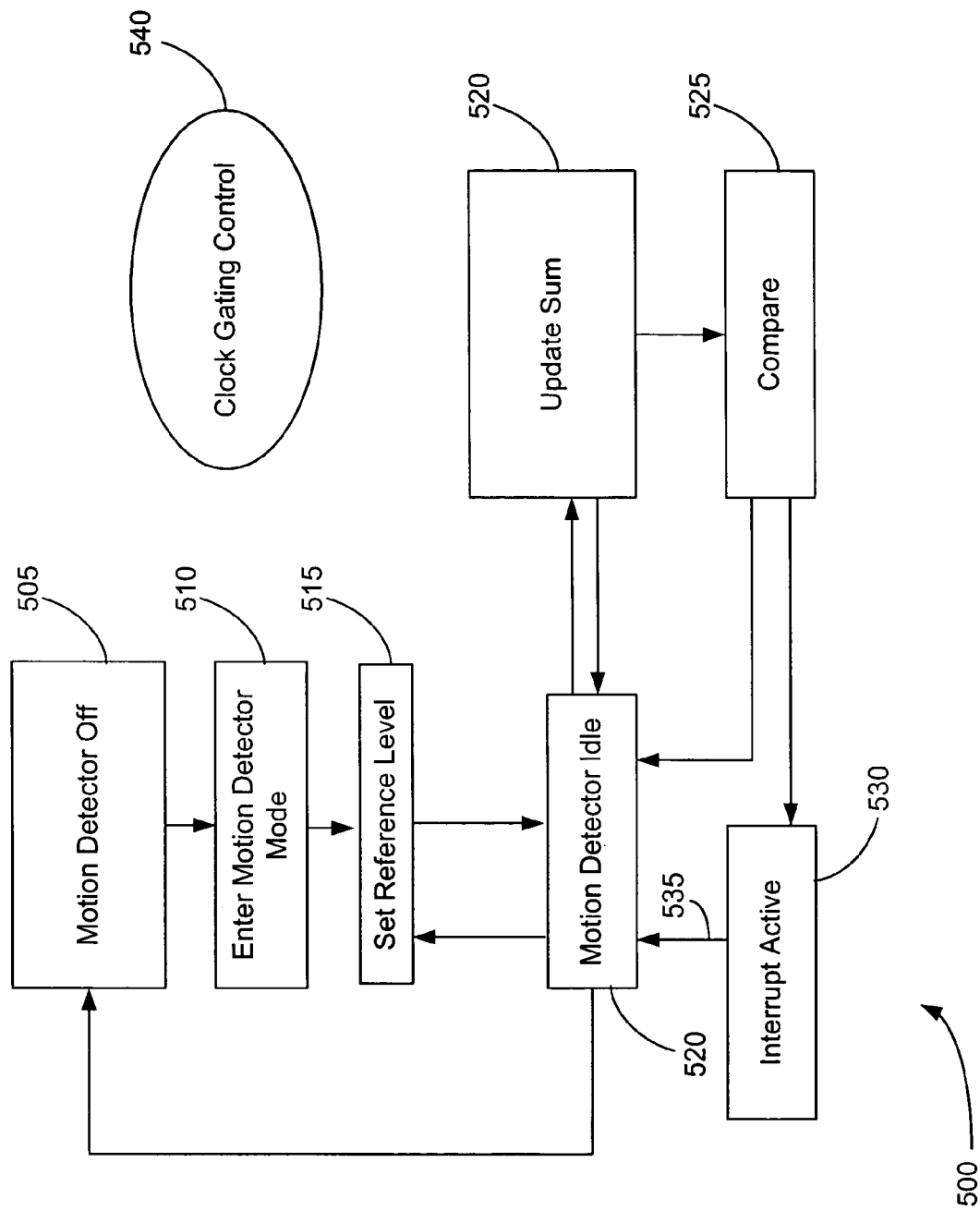
FIG. 5 shows a further methodical aspect of the present invention.

FIG. 5 shows a method 500 according to an embodiment of the present invention. Initially, the motion detector is off 505. Upon turning on, the motion detector enters motion detector mode 510, and a reference level is set 515 so that data from an accelerometer is appropriately offset to compensate for variable environmental conditions in which the accelerometer operates. If no significant data is forthcoming from the accelerometer (e.g. because the accelerometer data is not changing significantly over time), then the motion detector shifts to an idle mode, and may eventually revert to the "off" mode 505. However, if the motion detector does receive significant data from the accelerometer, then the motion detector updates 520 a sum of acceleration data, compares 525 that offset sum to a threshold, and activates 530 an interrupt if the result of the comparison 525 is positive (i.e. if a threshold is exceeded). The interrupt sends 535 the motion detector back to an idle state, because another unit (e.g. a full-accuracy signal processor) will become responsible for analyzing the accelerometer data, instead of the motion detector performing that analysis. The reference level is reset 515 not just when the motion detector is started, but also automatically and periodically after a specified time has passed, or this resetting 515 can be forced with a register write. A clock gating control 540 controls the idling or shutting off of certain areas of the acceleration measurement system during periods of acceptable inactivity, such as when the motion detector is idled or shut off after motion has been detected and an interrupt signal has been sent to a processor.

It is to be understood that all of the present figures, and the accompanying narrative discussions of best mode embodiments, do not purport to be completely rigorous treatments of the method, system, and apparatus under consideration. A person skilled in the art will understand that the steps and signals of the present application represent general cause-and-effect relationships that do not exclude intermediate interactions of various types, and will further understand that the various steps and structures described in this application can be implemented by a variety of different combinations of hardware and software which need not be further detailed herein.

What is claimed is:

1. A system, comprising:
   an accelerometer, responsive to acceleration of the system, configured to provide an accelerometer output signal having a magnitude indicative of at least one component of the acceleration;
   a motion detector, responsive to the accelerometer output signal, configured to provide a processor interrupt signal if the magnitude reaches a threshold; and
   a processor, responsive to the processor interrupt signal, configured to determine acceleration with higher accuracy than the motion detector is capable of
   wherein the interrupt signal is for interrupting a power-saving state of the processor and for beginning a power-saving state of the motion detector, and
   wherein the processor is responsive to the accelerometer output signal only when the processor interrupt signal has interrupted the processor.

2. The system of claim 1,
   wherein the interrupt signal separates a motion detector mode from a full accuracy mode,
   wherein, during the full accuracy mode, the processor is configured to utilize digital signal processing that includes low-pass filtering, a plurality of decimation stages, and a calibration algorithm, and
   wherein the motion detector mode has a lower energy requirement than the full accuracy mode.

3. The system of claim 1,
   wherein the system further comprises a converter for converting the accelerometer output signal from analog to digital.

4. The system of claim 1, wherein the processor is also configured to perform responses to the acceleration, but only if the processor has received the processor interrupt signal.

5. The system of claim 1, wherein the system is housed in a portable device that also includes a mobile communication terminal.

6. A method comprising:
   setting a reference level for each axis, upon enabling a motion detector,
   averaging acceleration data obtained from an accelerometer output signal, so as to accomplish low pass filtering results without a multiplier,
   updating the reference level at periods that are sufficiently small to offset temperature drift, and
   providing a processor interrupt signal if the motion detector concludes that an absolute difference between an average acceleration and a corresponding reference level exceeds at least one threshold
   wherein the interrupt signal is for interrupting a power-saving state of the processor and for beginning a power-saving state of the motion detector, and
   wherein the processor is responsive to the accelerometer output signal only when the processor interrupt signal has interrupted the processor.

7. The method of claim 6, further comprising the subsequent steps of the processor performing digital signal processing with low-pass filtering, a plurality of decimation stages, and a calibration algorithm.

8. The method of claim 7, wherein the subsequent steps are applied to further accelerometer output signals only if the processor confirms that the absolute difference between the average acceleration and the corresponding reference level exceeds the at least one threshold.

9. The method of claim 6,
   wherein the at least one threshold is programmed for each axis independently, and
   wherein exceeding at least one programmed combination of the at least one threshold is necessary for generating the interrupt signal.

10. A computer readable medium encoded with a software data structure sufficient for performing the method of claim 6.

11. A motion detector comprising:
    at least one reference level register, configured to set and periodically update a reference level for each axis,
    a summing register for each coordinate axis, configured to average acceleration data obtained from the accelerometer to yield an average acceleration,
    an offsetting and compare unit, configured to offset the average acceleration using the reference level, and configured to provide an offset acceleration, and compare the offset acceleration to at least one threshold, and
    an interrupt unit, configured to provide a processor interrupt signal if the at least one threshold is reached
    wherein the interrupt signal is for interrupting a power-saving state of the processor and for beginning a power-saving state of the motion detector.

12. The motion detector of claim 11,
    wherein the summing register is used instead of a multiplier,
    wherein the reference level is set and updated independently of device orientation and gravitational direction, and
    wherein the updating of the reference level is performed at intervals sufficient to offset temperature drift.

13. A method, comprising:
    providing an accelerometer output signal, having a magnitude indicative of at least one component of acceleration, to a motion detector, in response to the acceleration;
    providing a processor interrupt signal if the magnitude reaches a threshold, in response to the accelerometer output signal;
    determining acceleration with higher accuracy than the motion detector is capable of, in response to the processor interrupt signal; and
    providing instructions in response to determining the acceleration with higher accuracy;

wherein the interrupt signal is for interrupting a power-saving state of the processor and for beginning a power-saving state of the motion detector, and wherein the processor is responsive to the accelerometer output signal only when the processor interrupt signal has interrupted the processor.

14. The method of claim 13, wherein the determining of the acceleration with higher accuracy utilizes low-pass filtering, a plurality of decimation stages, and a calibration algorithm.

15. A computer readable medium encoded with a software data structure the software comprising codes which, when executed, control the following:

providing an accelerometer output signal, having a magnitude indicative of at least one component of acceleration, to a motion detector, in response to the acceleration of the system;

providing a processor interrupt signal if the magnitude reaches a threshold, in response to the accelerometer output signal;

determining acceleration with higher accuracy than the motion detector is capable of, in response to the processor interrupt signal; and providing instructions in response to determining the acceleration with higher accuracy;

wherein the interrupt signal is for interrupting a power-saving state of the processor and for beginning a power-saving state of the motion detector, and wherein the processor is responsive to the accelerometer output signal only when the processor interrupt signal has interrupted the processor.

16. The computer readable medium of claim 15, wherein the determining of the acceleration with higher accuracy utilizes low-pass filtering, a plurality of decimation stages, and a calibration algorithm.

17. A system, comprising:

means for providing an accelerometer output signal, having a magnitude indicative of at least one component of acceleration, in response to the acceleration of the system;

means for providing an interrupt signal if the magnitude reaches a threshold, in response to the accelerometer output signal; and means for determining acceleration with higher accuracy, in response to the interrupt signal, wherein the interrupt signal is for interrupting a power-saving state of the means for determining acceleration with higher accuracy, and for beginning a power-saving state of the means for providing the interrupt signal, and wherein the means for determining acceleration with higher accuracy is responsive to the accelerometer output signal only when the processor interrupt signal has interrupted the means for determining acceleration with higher accuracy.

18. Apparatus comprising:

a receiving unit configured to receive an accelerometer output signal having a magnitude indicative of at least one component of acceleration; and an interrupt unit configured to provide a processor interrupt signal if the magnitude reaches a threshold, wherein the apparatus is configured to enter a power-saving state if the magnitude reaches the threshold, and wherein the processor interrupt signal is for making the processor responsive to the accelerometer output signal.

19. The apparatus fo claim 18, further comprising a housing which also contains other components of an electronic device, including the accelerometer, the processor, and a power source responsive to the processor.

* * * * *

UNITED STATES PATENT AND TRADEMARK OFFICE
CERTIFICATE OF CORRECTION

| | |
|---|---|
| PATENT NO. | : 7,216,053 B2 |
| APPLICATION NO. | : 11/027024 |
| DATED | : May 8, 2007 |
| INVENTOR(S) | : J. Rakkoka et al. |

It is certified that error appears in the above-identified patent and that said Letters Patent is hereby corrected as shown below:

At col. 10, line 32 (claim 19, line 1), please change "fo" to --of--.

Signed and Sealed this

Twenty-ninth Day of July, 2008

JON W. DUDAS
*Director of the United States Patent and Trademark Office*